United States Patent
Lin (10) Patent No.: US 7,289,186 B2
(45) Date of Patent: Oct. 30, 2007

(54) METHOD FOR PACKAGING A LIQUID CRYSTAL PANEL

(75) Inventor: Cheng-Chun Lin, Hsin-Chu County (TW)

(73) Assignee: United Microdisplay Optronics Corp., Hsin-Chu (TW)

( * ) Notice: Subject to any disclaimer, the term of this patent is extended or adjusted under 35 U.S.C. 154(b) by 500 days.

(21) Appl. No.: 10/906,131

(22) Filed: Feb. 3, 2005

(65) Prior Publication Data

US 2006/0139507 A1    Jun. 29, 2006

(30) Foreign Application Priority Data

Dec. 23, 2004    (TW) .............................. 93140356 A (51) Int. Cl.
*G02F 1/136*    (2006.01)
(52) U.S. Cl. ........................................ 349/187; 349/58
(58) Field of Classification Search .................. 349/57, 349/58, 187, 190; 445/24, 25; 430/319, 430/321; 156/99, 108, 109, 272.2, 275.1, 156/275.3

See application file for complete search history.

(56) References Cited

U.S. PATENT DOCUMENTS

| | | | |
|---|---|---|---|
| 6,962,834 B2* | 11/2005 | Stark | 438/107 |
| 2002/0085158 A1* | 7/2002 | Armagost et al. | 349/149 |
| 2005/0161815 A1* | 7/2005 | Sun et al. | 257/738 |

* cited by examiner

*Primary Examiner*—Toan Ton
*Assistant Examiner*—Tai Duong
(74) *Attorney, Agent, or Firm*—Winston Hsu (57) ABSTRACT

A method for packaging a liquid crystal panel includes the steps of: (1) providing a liquid crystal panel mounted on a carrier substrate; (2) placing a window frame over the liquid crystal panel; (3) placing a lens or windowpane on a supporting platform of an inner flange of the window frame and then laterally repositioning the windowpane against the positioning ribs distributed on the inner flange; and (4) depositing sealing glue into a groove area between the window frame and the windowpane.

4 Claims, 8 Drawing Sheets

METHOD FOR PACKAGING A LIQUID CRYSTAL PANEL

BACKGROUND OF INVENTION

1. Field of the Invention

The present invention relates to a method for packaging a liquid crystal panel, and more particularly, to a method of mounting a liquid crystal panel onto a window frame.

2. Description of the Prior Art

The final step of packaging a conventional liquid crystal on silicon (LCOS) panel or a liquid crystal display panel typically involves placing a window frame and a windowpane on the panel to prevent the attachment of dust to the surface of a dust cover, thereby negatively affecting the quality of the images.

Figure 1:
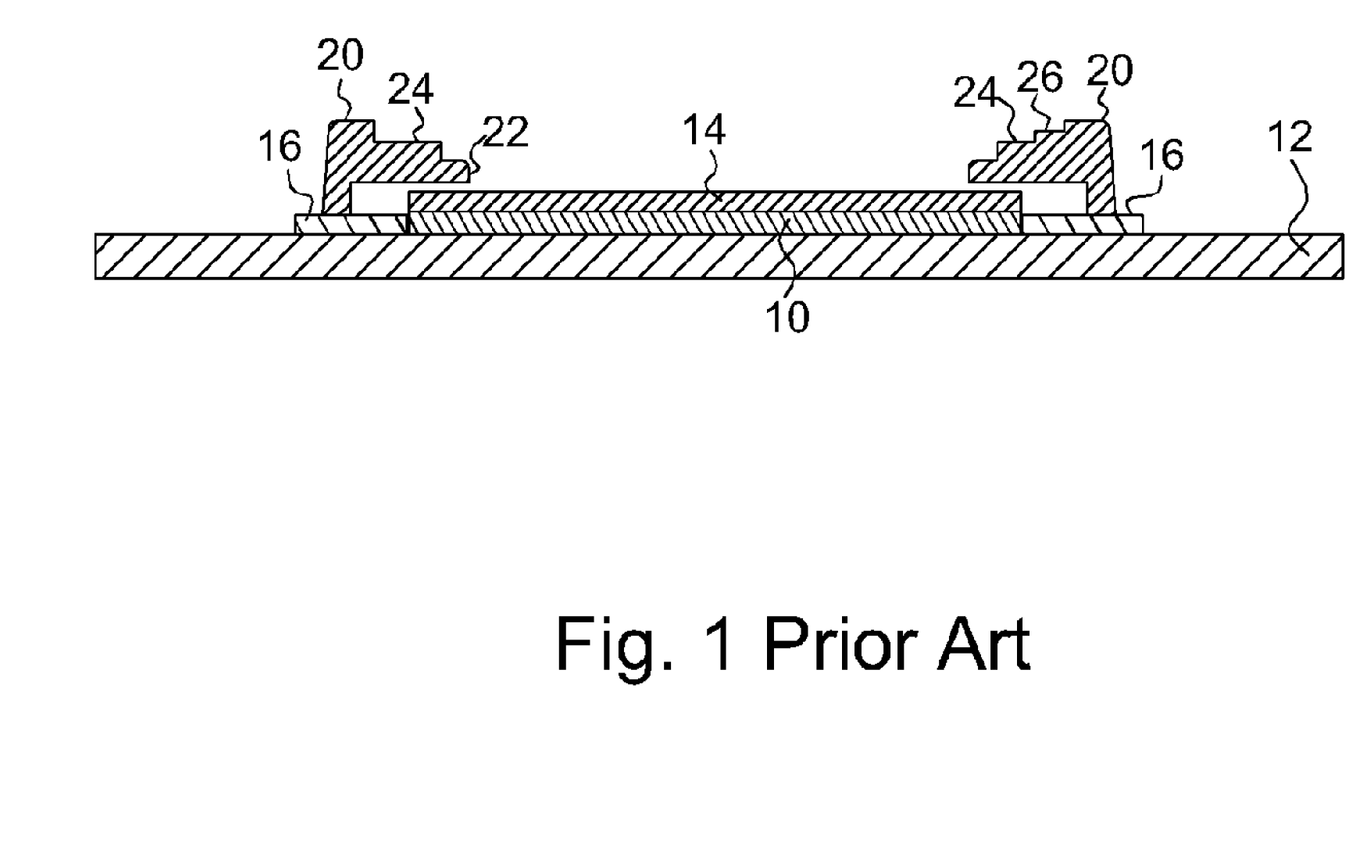
FIG. 1 through FIG. 4 are cross-sectional diagrams showing the method of disposing the window frame and windowpane on a liquid crystal panel according to the prior art.

Please refer to FIG. 1 through FIG. 4. FIG. 1 through FIG. 4 are cross-sectional diagrams showing the method of disposing of the window frame and windowpane on a liquid crystal panel according to the prior art. As shown in FIG. 1, a liquid crystal panel 10 is fixed on a carrier substrate 12, in which the surface of the liquid crystal panel 10 includes a dust cover 14 disposed thereon. First, a window frame 20 is fixed on a gasket 16 that surrounds the liquid crystal panel 10. The window frame 20 comprises a central opening 22 corresponding to the light sensitive region of the liquid crystal panel 10 and the inner flange of the window frame 20 provides a supporting platform 24 and a positioning side 26 for supporting the window frame.

Figure 2:
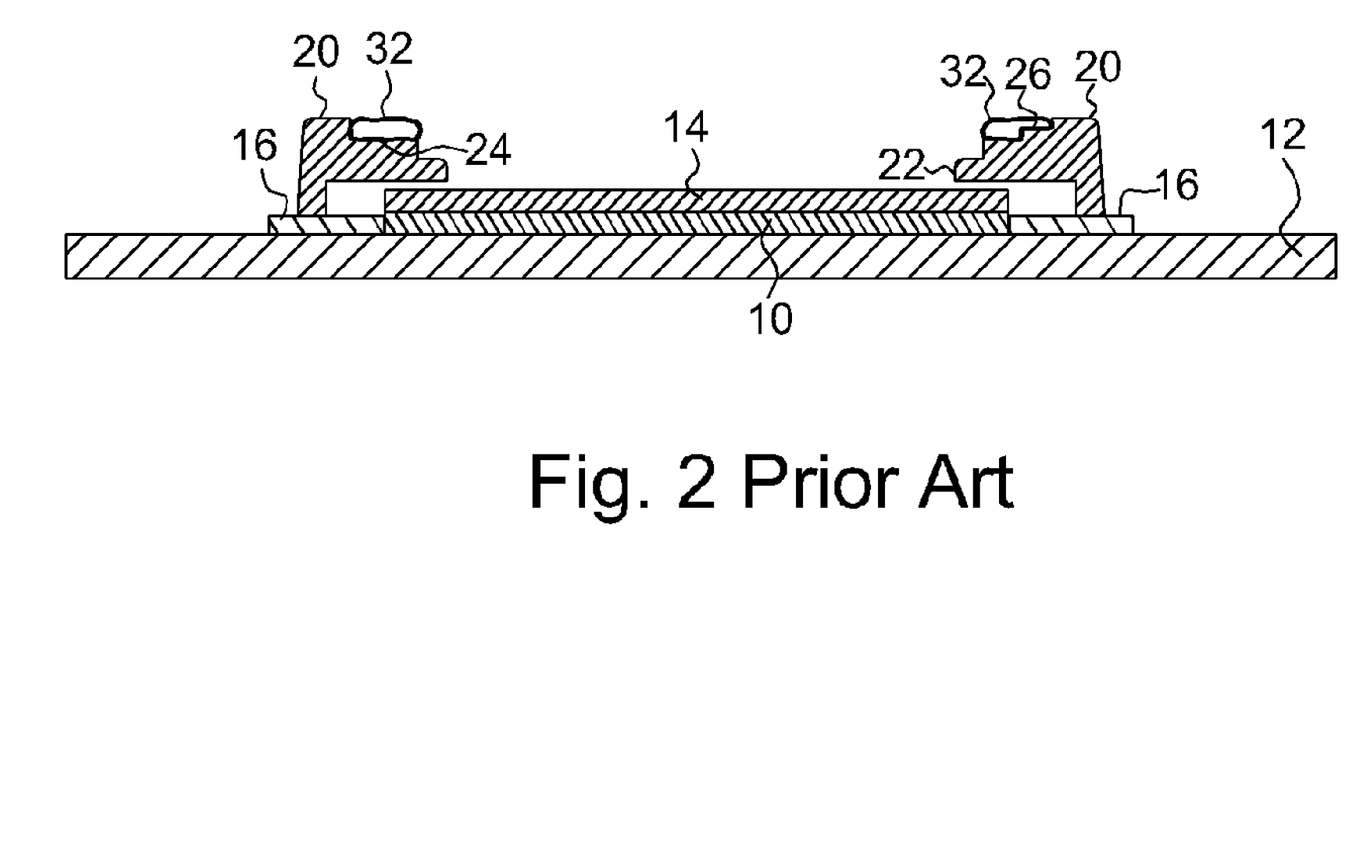
Figure 3:
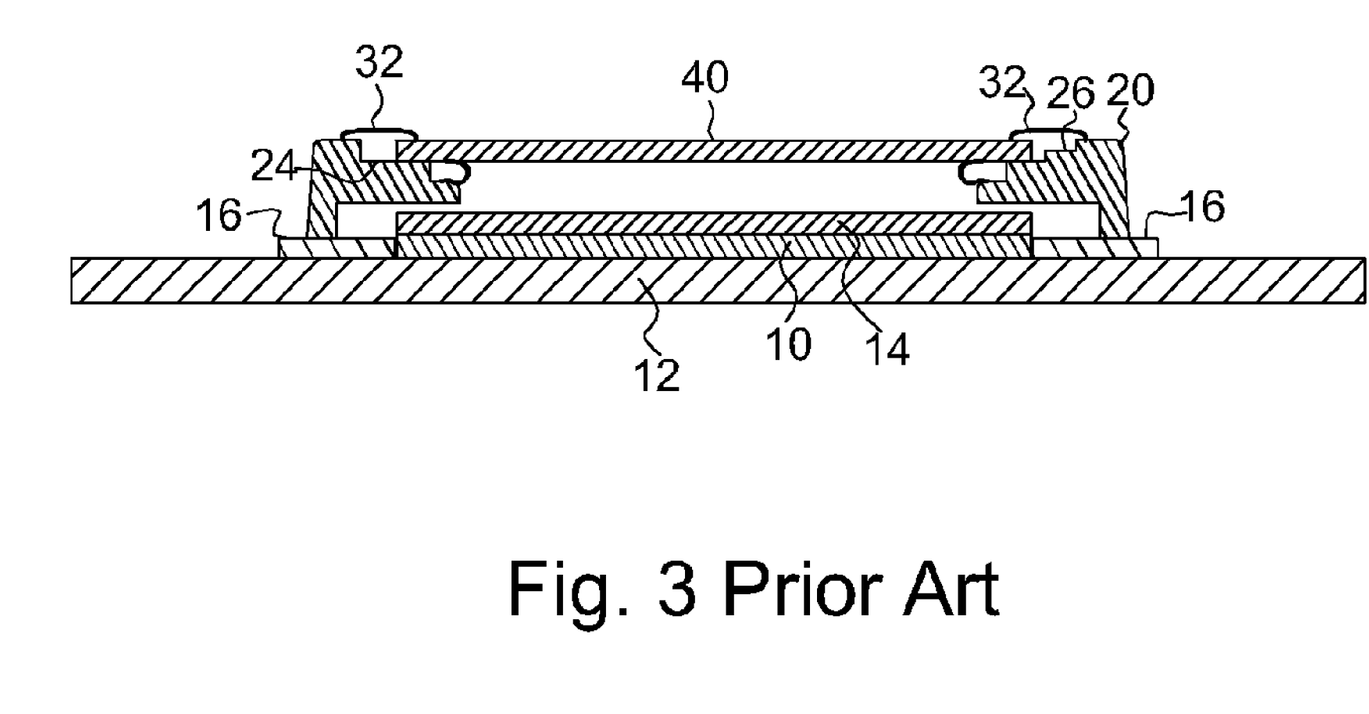

As shown in FIG. 2, a sealing process is performed to deposit a sealing glue 32 on the supporting platform 24. As shown in FIG. 3, a windowpane 40 is placed on the supporting platform 24 of the window frame 20 and by utilizing the fluidity of the sealing glue 32, the windowpane 40 is adjusted and repositioned against the positioning structure 26.

Figure 4:
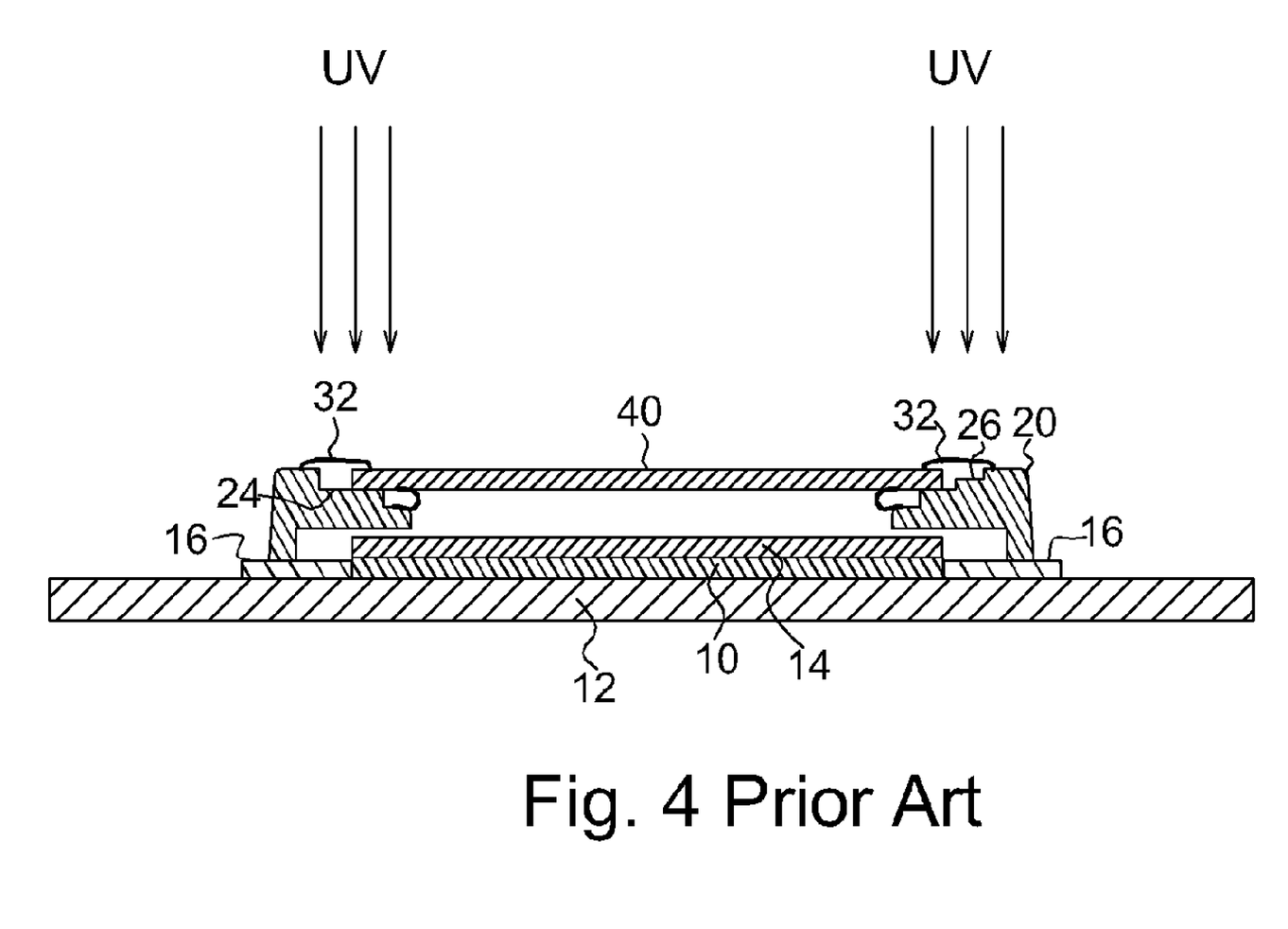

Next, the finished product of the liquid crystal panel covered with the windowpane 40 is moved to a device for ultraviolet treatment, in which the sealing glue 32 is solidified by the ultraviolet rays, as shown in FIG. 4.

The conventional methods often include the following disadvantages:

(a) An uneven force distribution will result when the sealing glue 32 pulls the windowpane at the supporting platform 24 and eventually influences the direction of the polarizing beams.

(b) After the sealing glue is deposited, the placement of the windowpane is hindered because the location of the positioning structure 26 is difficult to recognize. Additionally, overflow of the sealing glue must be prevented.

(c) Disposed near the edge of the groove area, the positioning structure 26 is an unsuitable chamfer.

(d) Some sealing glue will remain in between the windowpane 40 and the positioning structure 26 resulting in a less tightly attached windowpane. This has a negative effect on the overall yield.

(e) It is difficult to control the amount of deposited sealing glue 32. Deposits of excessive sealing glue 32 will cause overflow (shown in FIG. 3) and result in a dirty windowpane 40 or dirty dust cover 16 surfaces. Occasionally, the entire device will fail and become unfixable.

(f) The long duration of the sealing process and ultraviolet exposing process will influence the overall yield.

SUMMARY OF INVENTION

It is therefore an objective of the present invention to provide a method for packaging a liquid crystal panel for solving the above-mentioned problems.

According to the preferred embodiment of the present invention, a method for packaging a liquid crystal panel comprising: providing a liquid crystal panel, wherein the panel is mounted on a carrier substrate; placing a window frame over the liquid crystal panel, wherein the window frame further comprises an opening corresponding to the light sensitive region of the liquid crystal panel, a supporting platform, and a plurality of positioning ribs disposed on the inner flange of the window frame; placing a lens or windowpane on the supporting platform of the window frame and laterally repositioning the lens or windowpane against the positioning ribs, wherein a groove area is further defined in between the windowpane and the window frame; and depositing a sealing glue into the groove area.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
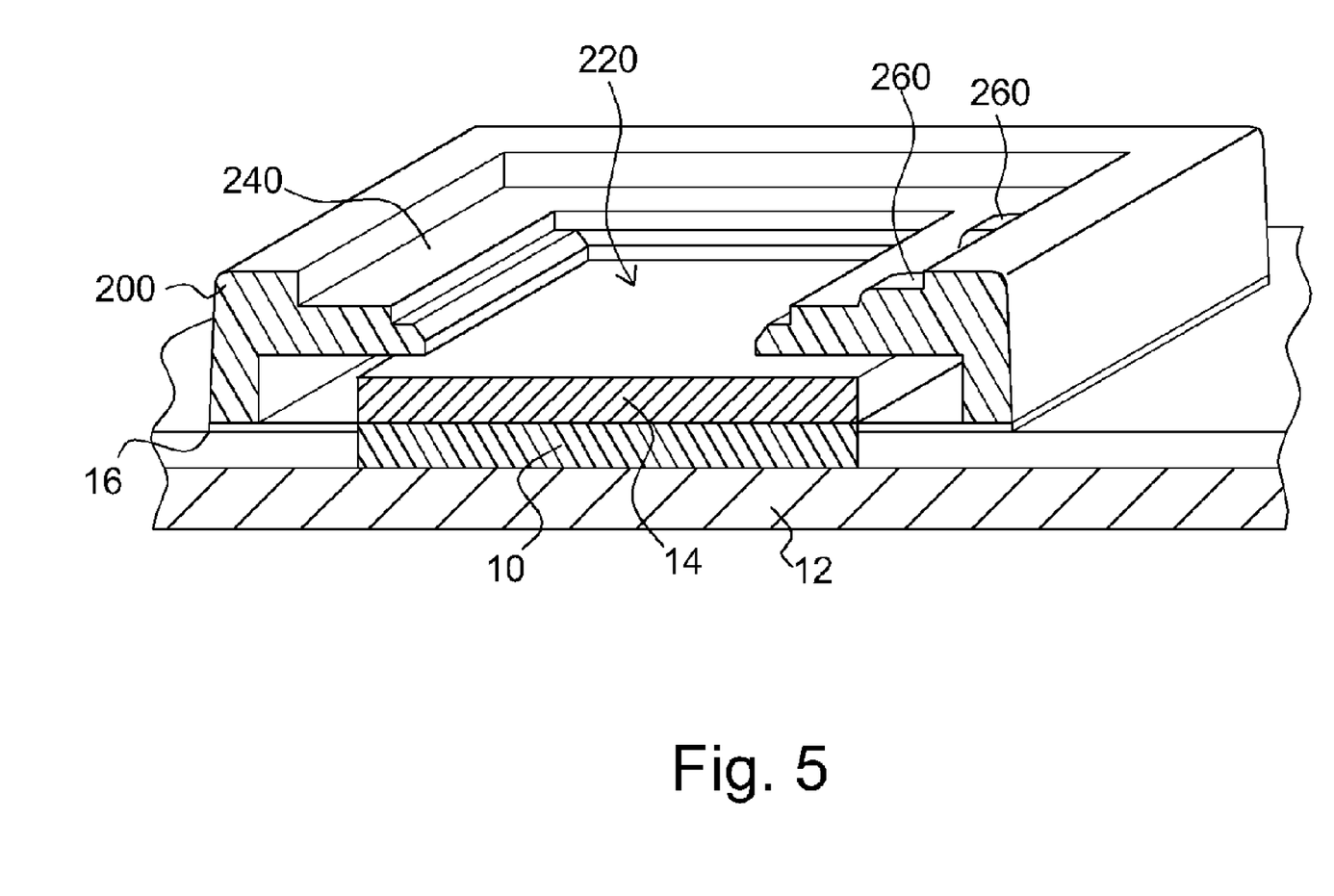
FIG. 5 through FIG. 8 are cross-sectional diagrams showing the method of mounting a liquid crystal panel onto a window frame according to the present invention.

Please refer to FIG. 5 through FIG. 8. FIG. 5 through FIG. 8 are cross-sectional diagrams showing the method of mounting a liquid crystal panel onto a window frame according to the present invention. As shown in FIG. 5, a liquid crystal panel 10 is fixed on a carrier substrate 12 in which the surface of the liquid crystal panel 10 includes a dust cover 14 disposed thereon. First, a window frame 200 is fixed on a gasket 16 that surrounds the liquid crystal panel 10. The window frame 20 comprises a central opening 220 corresponding to the light sensitive region of the liquid crystal panel 10 and the inner flange of the window frame 200 provides a supporting platform 240 and a plurality of positioning ribs 260 for supporting the window frame.

One of the key characteristics of the present invention is to replace the conventional positioning side with positioning ribs 260 for achieving a precise reposition with minimal requirements.

Figure 6:
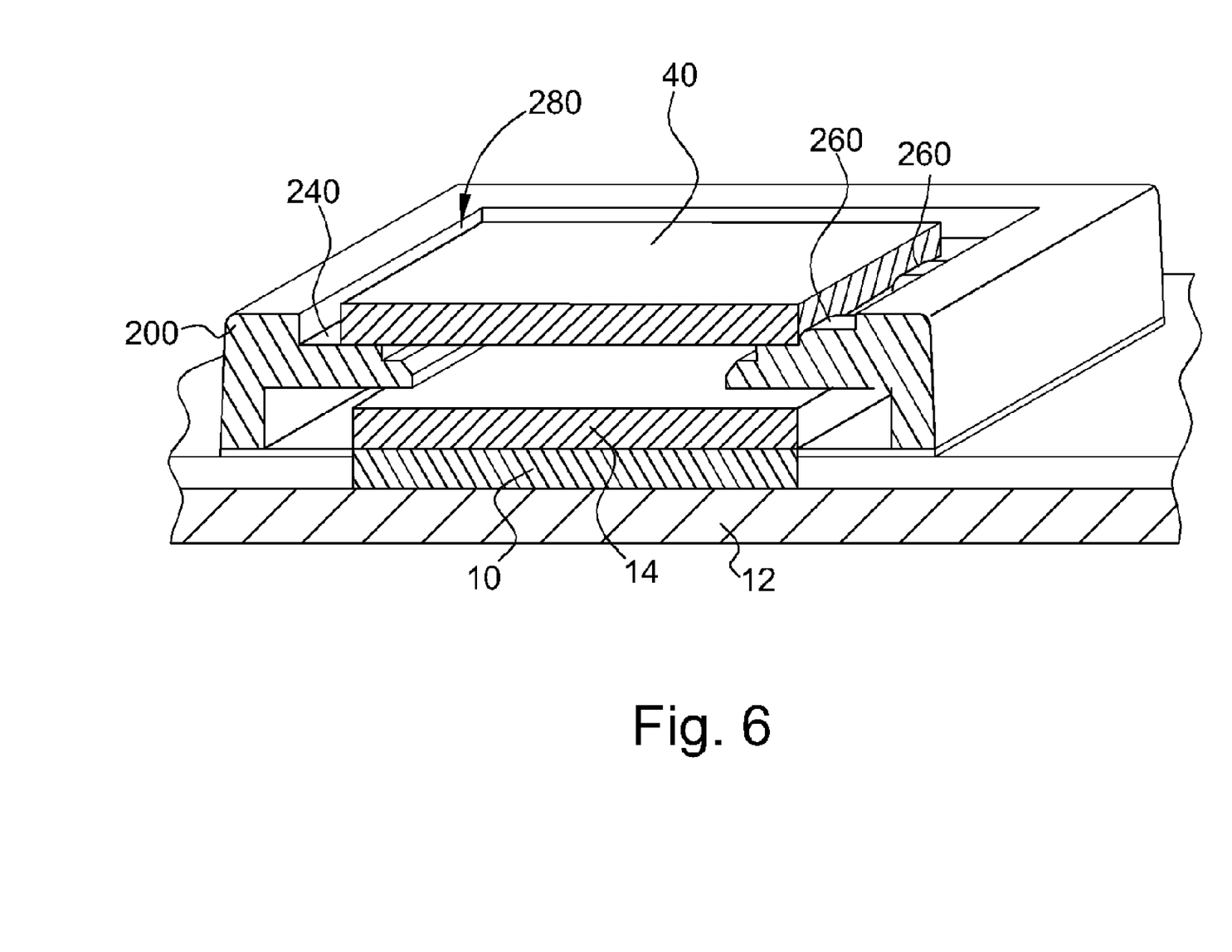

According to the preferred embodiment of the present invention, a windowpane 40 is placed on the supporting platform 240 and laterally repositioned against the positioning ribs 260 of the window frame 200. Next, a groove area 280 will be formed in between the sidewall of the windowpane 40 and the window frame 200.

Figure 7:
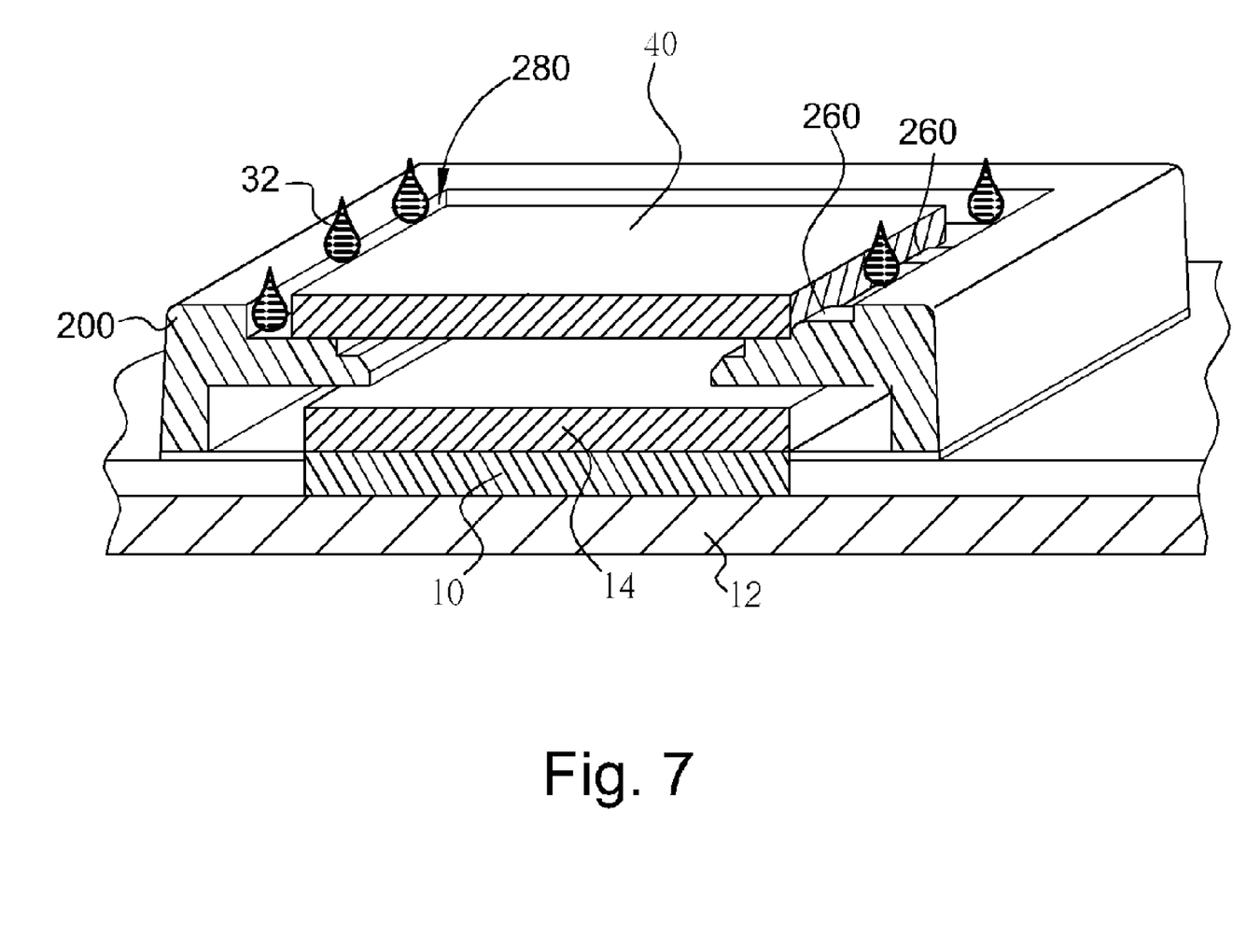

As shown in FIG. 7, a sealing process is performed to deposit the sealing glue 32 into the groove area 280. Another characteristic of the present invention is that the assembly and reposition of the windowpane is completed before the sealing process. Hence no additional sealing glue will remain in between the window frame 200 and the supporting platform 240 and the pulling force of the glue will be evenly maintained, thereby preventing the uneven force distribution phenomenon.

Figure 8:
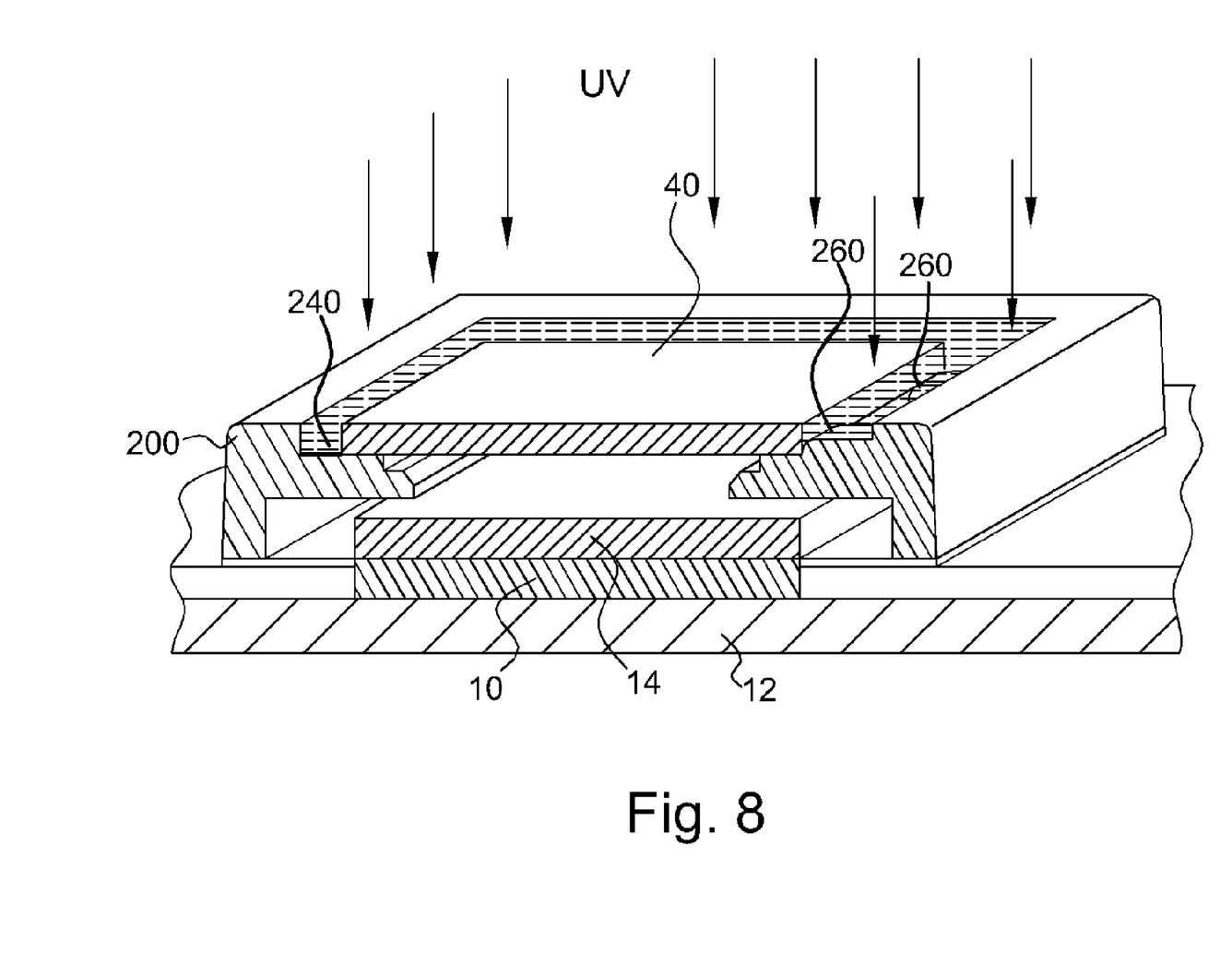

Due to the fact that the sealing glue 32 is able to flow freely within the groove area, the present invention is able to allow a higher level of error tolerance and also monitor and control the quantity of the sealing glue 32. As shown in FIG. 8, the finished product of the liquid crystal panel is then moved to a device for ultraviolet treatment, in which the ultraviolet rays solidify the sealing glue 32.

Overall, the method disclosed by the present invention provides the following advantages:

(a) Sealing glue is deposited on the edge of windowpane after the assembly process is finished, thereby causing the pulling force of the glue to spread out evenly thereby preventing the problems of uneven force distribution.

(b) By utilizing the positioning rib 260 for repositioning the windowpane a precise reposition can be achieved with minimum requirements.

(c) By utilizing the positioning rib 260 as a chamfer the assembly process can be further enhanced.

(d) The windowpane 40 and the positioning rib 260 can be tightly attached.

(e) The control of the sealing glue quantity is simple and thus easily monitored during the sealing process.

(f) After the sealing process, the sealing glue is able to flow freely within the groove area thereby allowing a higher level of error tolerance during the packaging process.

(g) The sealing process and the assembly process of the windowpane can be separated, thereby facilitating the arrangement of the entire fabrication process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for packaging a liquid crystal panel comprising:

providing a liquid crystal panel, wherein the panel is mounted on a carrier substrate;

placing a window frame over the liquid crystal panel, wherein the window frame further comprises an opening corresponding to a light sensitive region of the liquid crystal panel, a supporting platform and a plurality of positioning ribs disposed on an inner flange of the window frame;

placing a lens or windowpane on the supporting platform of the window frame and laterally repositioning the lens or windowpane against the positioning ribs, wherein a groove area is further defined in between the windowpane and the window frame; and depositing a sealing glue into the groove area.

2. The method of claim 1, wherein the liquid crystal panel includes a liquid crystal on silicon (LCOS) panel.

3. The method of claim 1, wherein the step of depositing the sealing glue further comprising:

an ultraviolet radiation process for utilizing ultraviolet rays to cure and solidify the sealing glue.

4. The method of claim 1, wherein the liquid crystal panel further comprises a dust-proof cover disposed thereon.

* * * * *